A. ASHLEY.
REINFORCED RESILIENT HEEL FOR BOOTS AND SHOES.
APPLICATION FILED AUG 31, 1910.

999,358.

Patented Aug. 1, 1911.
2 SHEETS—SHEET 1.

Witnesses:
L. H. Staader
A. Hoyer

Inventor:
Arthur Ashby
By Dr. Alfred Miller
Att'y

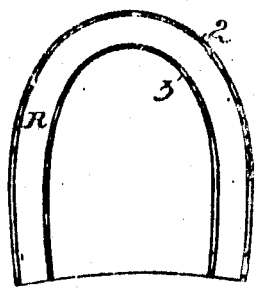
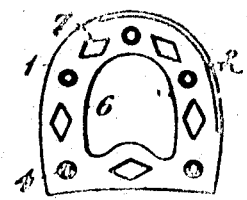
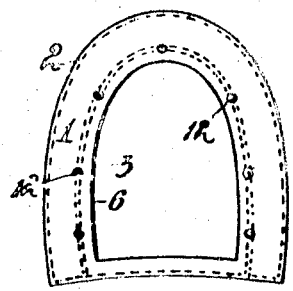
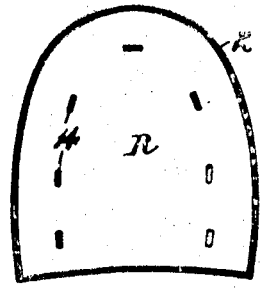

UNITED STATES PATENT OFFICE.

ARTHUR ASHLEY, OF MELBOURNE, VICTORIA, AUSTRALIA.

REINFORCED RESILIENT HEEL FOR BOOTS AND SHOES.

999,358.

Specification of Letters Patent.

Patented Aug. 1, 1911.

Application filed August 31, 1910. Serial No. 579,823.

*To all whom it may concern:*

Be it known that I, ARTHUR ASHLEY, a subject of the King of Great Britain, residing at 493 Collins street, Melbourne, in the State of Victoria, Commonwealth of Australia, hair-dresser, have invented an Improved Reinforced Resilient Heel for Boots or Shoes, of which the following is a specification.

With resilient heels for use on boots or shoes at present in vogue it is found that they wear down very quickly and particularly at the back, thus producing an uneven and somewhat uncomfortable surface, and it is with the object of obviating this defect without the loss of the advantages attendant to such heels that the present invention has been devised.

The accompanying drawings show the invention as adapted to various types of boots and shoes.

Figure 1:
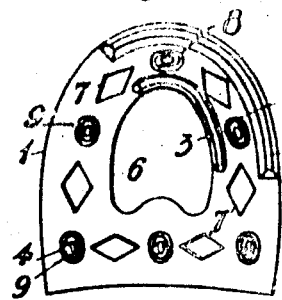
Figure 3:
Figure 2:
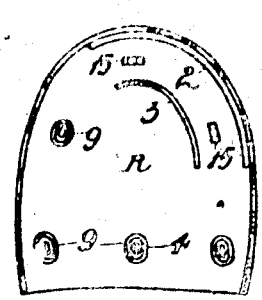
Figure 4:
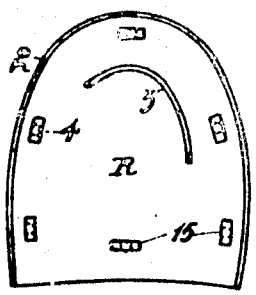
Figure 5:
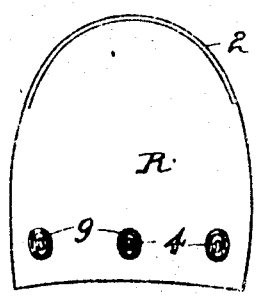
Figure 6:
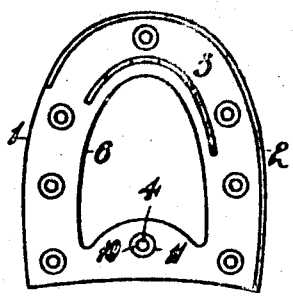
Figure 7:
Figure 8:
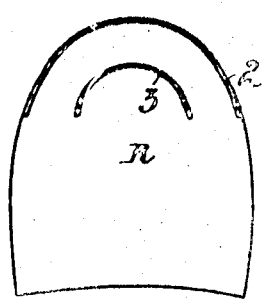

Figure 1 is a plan of the reinforcing plate of the resilient heel. Fig. 2 is a plan of the wearing surfaces of the complete heel, and Fig. 3 a central longitudinal section therethrough. Fig. 4 is a plan of the heel formed with indentations. Fig. 5 is a plan of the heel with only one flange. Fig. 6 is a plan of the plate showing a portion of the outer flange cut away. Fig. 7 a central longitudinal section through Fig. 6. Fig. 8 is a plan of a heel with inner and outer flanges about the back thereof. Fig. 9 is a plan of a heel with the flanges extended around the back and sides. Fig. 10 is a plan of a plate particularly suitable for ladies' shoes. Fig. 11 is an underside plan of the heel plate showing the outer flange extended completely around same. Fig. 12 is a central vertical section through Fig. 11. Fig. 13 is a central vertical section through a plate showing the slotted flange, and Fig. 14 is a plan of a heel formed with the plate having a notched inner flange.

According to this invention the resilient heel is provided on its inner or underside with a thin metal base plate 1, which is stamped or cast to the shape or contour of the heel and provided with one or more flanges, rims or projections 2, 3, extending at right angles thereto so that the edges constitute wearing surfaces. The plate is concave or slightly dished on its underside or inclined inwardly as at C, as shown in the sectional Figs. 3, 7, 12 and 13, and is formed with holes 4 through which the securing nails are driven. The outer flange 2 may extend completely around the edge of the plate, as shown in Figs. 11 and 14, or around the sides and back, as in Fig. 4, or for only a short distance around the back and either side as shown in Figs. 1, 2, 5, 6, 8 and 10. The other or inner flange 3 is formed on the plate at some distance from the inner side of the outer flange 2 and preferably follows approximately the contour thereof. It may extend practically around the plate, as in Figs. 9, 11, 13 and 14, or only partially around, as in Figs. 1, 2, 4, 6 and 8, or it may be dispensed with altogether, as in Figs. 5 and 10 particularly for light boots or shoes, while both flanges may have inclined or beveled sides, as shown in Figs. 1, 2 and 3. This inner flange may be formed with one or more interstices or slots 5, Figs. 7 and 13 and the plate is formed with an approximately central opening 6 of comparatively large area and also by preference with a series of smaller openings 7 of any desired shape. The nail holes 4 in the plate may be formed through small projections 8, 9, on said plate, as in Fig. 1 and some of such projections, such as 9 may extend flush with the edges of the flanges and constitute wearing surfaces, as in Figs. 1, 2, 3 and 5, such construction being desirable when the inner flange is not extended around the heel. Eyelets 10 with projecting flared ends 11 may be inserted in the holes 4, as in Figs. 6 and 7 for the purpose of gripping the resilient material. In lieu of the nail holes attaching spikes 12 may be provided on the inner side of the plate, as in Figs. 11 and 12. The inner flange may have notches 13 formed in its edge at intervals, as in Fig. 13 so as to leave a series of projecting wearing studs 14, as in Figs. 13 and 14.

In the manufacture of the reinforced resilient heel the plate is placed in a mold of the contour of said plate and of the depth equal to that of the flanges, but it is flat on the bottom against which the slightly concave dished or inwardly inclined underside of the plate is placed as will be understood by reference to Fig. 3. Rubber or other moldable resilient or semiresilient material R is forced or compressed onto the plate so that it passes through the central and other openings in the plate and through the interstices in the flanges also between the studs thereon and between the apertured projections on the plate and over and under the flared ends of the eyelets. By this means the material is interlocked securely with the plate, which is now really embedded in said material in such a manner that on the flat wearing surface of the heel only the wearing edges or surfaces of the flanges and projections, which are flush with the exterior face of the material are visible. It will be observed by reference to Fig. 3 that by reason of the concave or dished shaped inner or underside of the plate being placed against the flat bottom of the mold, the material passes through the central opening 6 and other openings 7 and spreads on the underside of said plate forming a cushion for the human heel.

With a heel manufactured as described the usual quick wearing portions of the heels are protected by metal reinforcements, while the resilient material, which is pressed through the central opening in the plate takes up the jar when walking.

It will be readily understood that the mold may be so shaped as to form indentations 15, as in Figs. 2 and 4 in the outer surface of the resilient portion of the heel to indicate the location of the nail holes 4.

It is to be understood that the illustrations of the variations in the construction of the plate are given to show the adaptability of the invention to boots or shoes of various kinds. The preferred form is shown in Figs. 1, 2 and 3, as the reinforcement is applied to that part of the heel, which usually wears quickest in all kinds of boots and shoes, but for heavy workmen's boots, the form shown in either Figs. 9, 11 and 14, are preferable, while for ladies' shoes a light single flanged plate, as shown in Fig. 10 is desirable.

Having now particularly described and ascertained the nature of my said invention and in what manner the same is to be performed, I declare that what I claim is:—

1. An improved reinforced resilient heel for boots or shoes, comprising a base plate dished on its underside and formed with an approximately central opening, and a series of projecting apertured studs on said plate, flanges on said plate extending outwardly at right angles thereto, in combination with resilient material compressed onto said plate and through said opening so that the outer surface of said material is flush with the outer edges of said flanges and means for securing said heel to the boot or shoe.

2. An improved reinforced resilient heel for boots or shoes, comprising a base plate dished on its underside and formed with an approximately central opening, and a series of smaller openings, flanges on said plate extending outwardly at right angles thereto, a series of projecting apertured studs on said plate in combination with resilient material compressed onto said plate and through said openings so that the outer surface of said material is flush with the outer edges of said flanges, and means for securing said heel to the boot or shoe.

3. An improved reinforced resilient heel for boots or shoes, comprising a base plate dished on its underside and formed with an approximately central opening, flanges on said plate extending outwardly at right angles thereto and apertured studs on said plate having their outer ends flush with the outer edges of said flanges to form wearing surfaces, in combination with resilient material compressed onto said plate and through said opening so that the outer surface of said material is flush with the outer edges of said flanges, and means for securing said heel to the boot or shoe.

4. An improved reinforced resilient heel for boots or shoes, comprising a base plate dished on its underside and formed with an approximately central opening, an outer flange on said plate along its outer edge and an inner flange distanced therefrom, in combination with resilient material compressed onto said plate and through said opening so that the outer surface of said material is flush with the outer edges of said flanges, and means for securing said heel to the boot or shoe.

5. An improved reinforced resilient heel for boots or shoes, comprising a base plate dished on its underside and formed with an approximately central opening, an outer and inner flange on said plate, recesses in said inner flange at intervals to form varying studs, in combination with resilient material compressed onto said plate and through said opening so that the outer surface of said material is flush with the outer edges of said flanges and means for securing said heel to the boot or shoe.

6. An improved reinforced resilient heel for boots or shoes, comprising a base plate dished on its underside and formed with an approximately central opening, flanges on said plate extending outwardly at right angles thereto and spikes on the underside of said plate, in combination with resilient material compressed onto said plate and through said opening so that the outer surface of said material is flush with the outer edges of said flanges.

In testimony whereof I have hereunto set my hand in presence of two subscribing witnesses.

ARTHUR ASHLEY.

Witnesses:
WILLIAM HERBERT WATERS,
ARTHUR JAMES WATERS.